Figure 1:
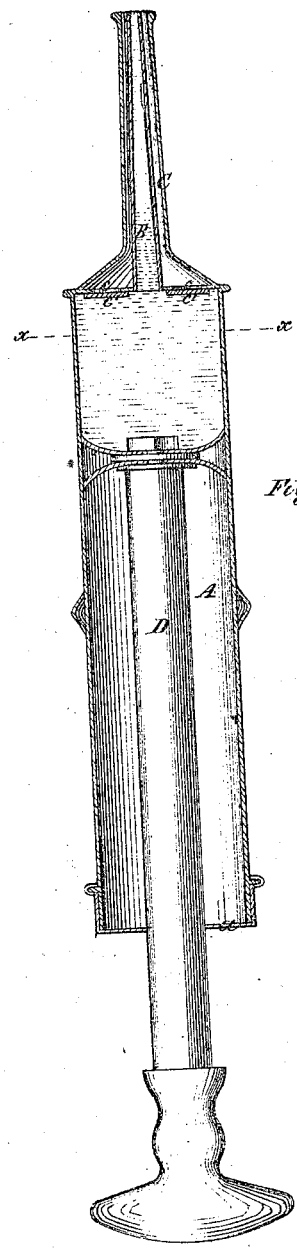

P. F. Cederholm,
Syringe.

No. 97,165. Patented Nov. 23, 1869.

Witnesses:

United States Patent Office.

PETER F. CEDERHOLM, OF STILLWATER, MINNESOTA.

Letters Patent No. 97,165, dated November 23, 1869.

IMPROVEMENT IN SYRINGES.

The Schedule referred to in these Letters Patent and making part of the same.

*To all whom it may concern:*

Be it known that I, PETER F. CEDERHOLM, of Stillwater, in the county of Washington, and State of Minnesota, have invented a new and useful Improvement in Syringes; and I do hereby declare that the following is a full, clear, and exact description of the same, with reference to the drawing, forming part of this specification, and in which—

Figure 2:
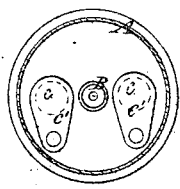

Figure 1 represents a longitudinal section of a syringe, constructed in accordance with my invention, and Figure 2, a transverse section on the line $x\ x$, showing the valves and central discharge-pipe.

Similar letters of reference indicate corresponding parts.

This invention is an improvement in syringes adapted more especially for the purpose of extinguishing fires; and to this end, It consists in having a separate suction-pipe formed around a central discharge-pipe, said suction-pipe being provided, at its inner end, with valves that open into the cylinder, whereby the piston is enabled to draw in a large volume of water through both pipes, but to discharge it only through the central pipe.

To enable others skilled in the art to construct syringes according to my invention, I will proceed to describe the same, with reference to the drawing.

A is the barrel of a syringe, constructed of a suitable capacity and form.

B is a central discharge-pipe secured to one end of the barrel A, of a tapering form, and sufficient length to answer its purpose.

C is a separate suction-pipe formed around the discharge-pipe B, large enough to leave an annular space for the whole length of the pipe B, spreading itself near where it meets the end of the barrel, until it assumes about the same size as the latter.

This suction-pipe communicates with the barrel A, through holes $c\ c$, provided with valves $c'\ c'$.

These valves open into the barrel of the syringe and allow the water to be drawn into the same by means of a piston, D, but close the holes $c\ c$, when the discharge takes place through the pipe B.

$a$ is a guide for the piston D, and also serves as a cover for the other end of the barrel.

This construction of the syringe secures an easy admission of a larger body of water into the barrel than is the case in syringes heretofore made, and may therefore be filled very rapidly, while it provides for the ejection of the water with great force and to a great distance.

What is here claimed, and desired to be secured by Letters Patent, is—

The syringe, having a separate suction-pipe, C, formed around the central discharge-pipe B, and provided with valves $c\ c$, substantially as and for the purpose herein described.

PETER F. CEDERHOLM.

Witnesses:
O. ENGDAHL,
T. W. PETERSON.